US011207919B2

(12) United States Patent
Liao et al.

(10) Patent No.: US 11,207,919 B2
(45) Date of Patent: Dec. 28, 2021

(54) METHODS FOR TREATING INNER LINER SURFACE, INNER LINERS RESULTING THEREFROM AND TIRES CONTAINING SUCH INNER LINERS

(71) Applicant: Bridgestone Americas Tire Operations, LLC, Nashville, TN (US)

(72) Inventors: Kung-Ching Liao, Copley, OH (US); Joshua P. Abell, Franklin, TN (US); Jenny L. Sheaffer, Waite Hill, OH (US)

(73) Assignee: Bridgestone Americas Tire Operations, LLC, Nashville, TN (US)

( * ) Notice: Subject to any disclaimer, the term of this patent is extended or adjusted under 35 U.S.C. 154(b) by 264 days.

(21) Appl. No.: 15/629,096

(22) Filed: Jun. 21, 2017

(65) Prior Publication Data
US 2017/0361655 A1  Dec. 21, 2017

Related U.S. Application Data

(60) Provisional application No. 62/352,621, filed on Jun. 21, 2016.

(51) Int. Cl.
| | | |
|---|---|---|
| *B60C 1/00* | (2006.01) | |
| *B60C 5/04* | (2006.01) | |
| *B29D 30/06* | (2006.01) | |
| *B29D 30/00* | (2006.01) | |
| *B60C 19/12* | (2006.01) | |
| *B60C 17/00* | (2006.01) | |
| *B60C 19/00* | (2006.01) | |
| *B29D 30/48* | (2006.01) | |
| *B60C 5/14* | (2006.01) | |

(52) U.S. Cl.
CPC ............ *B60C 5/04* (2013.01); *B29D 30/0681* (2013.01); *B60C 1/0008* (2013.01); *B29D 30/0005* (2013.01); *B29D 2030/0682* (2013.01); *B29D 2030/483* (2013.01); *B60C 5/14* (2013.01); *B60C 17/00* (2013.01); *B60C 19/002* (2013.01); *B60C 19/122* (2013.01); *B60C 19/127* (2013.01)

(58) Field of Classification Search
CPC ........ B29D 30/0005; B29D 2030/0682; B60C 1/0008; B60C 19/002; B60C 19/122; B60C 19/127; B60C 17/00
See application file for complete search history.

(56) References Cited

U.S. PATENT DOCUMENTS

| | | |
|---|---|---|
| 3,935,893 A | 2/1976 | Stang et al. |
| 4,113,401 A | 9/1978 | McDonald |
| 4,113,799 A | 9/1978 | Van Ornum et al. |
| 4,116,895 A | 9/1978 | Kageyama et al. |
| 4,359,078 A | 11/1982 | Egan |
| 4,426,468 A | 1/1984 | Ornum et al. |
| 4,443,279 A * | 4/1984 | Sandstrom ............. B29D 30/00 152/504 |
| 4,607,065 A | 8/1986 | Kitamura et al. |
| 4,657,958 A | 4/1987 | Fieldhouse et al. |
| 4,707,526 A | 11/1987 | Sasaki et al. |
| 4,732,925 A | 3/1988 | Davis |
| 4,778,852 A | 10/1988 | Futamura |
| 4,810,565 A | 3/1989 | Wasitis et al. |
| 4,816,101 A | 3/1989 | Hong et al. |
| 4,913,209 A | 4/1990 | Hong et al. |
| 4,915,856 A | 4/1990 | Jamison |
| 4,971,831 A | 11/1990 | Ohba et al. |
| 5,085,942 A | 4/1992 | Hong et al. |
| 5,242,727 A | 9/1993 | Briddell et al. |
| 5,276,258 A | 1/1994 | Knobloch et al. |
| 5,389,715 A | 2/1995 | Davis et al. |
| 5,426,147 A * | 6/1995 | Laube ...................... C08K 3/04 524/495 |
| 5,556,636 A | 9/1996 | Yano et al. |
| 5,849,133 A | 12/1998 | Senderling et al. |
| 5,900,088 A | 5/1999 | Yamagiwa |
| 5,985,981 A | 11/1999 | Alexander et al. |
| 6,101,767 A | 8/2000 | Georgeau |
| 6,103,811 A | 8/2000 | Midorikawa et al. |
| 6,120,869 A | 9/2000 | Cotsakis et al. |
| 6,183,551 B1 | 2/2001 | Okamoto et al. |
| 6,303,694 B1 | 10/2001 | Hogan et al. |
| 6,436,498 B1 | 8/2002 | Rangwalla et al. |
| 6,500,286 B1 | 12/2002 | Ishikawa et al. |
| 6,502,360 B2 | 1/2003 | Carr, III et al. |

(Continued)

FOREIGN PATENT DOCUMENTS

| | | |
|---|---|---|
| BR | PI1102846 A2 | 7/2013 |
| CN | 1176618 A | 3/1998 |

(Continued)

OTHER PUBLICATIONS

International Search Report and Written Opinion from PCT/US2017/066271 dated Apr. 9, 2018.

(Continued)

*Primary Examiner* — Timothy Kennedy
*Assistant Examiner* — Alexander A Wang
(74) *Attorney, Agent, or Firm* — Meredith E. Hooker; Jenny L. Sheaffer

(57) ABSTRACT

Methods for treating the surface of a cured inner liner are disclosed. By use of these methods a treated, cured inner liner is produced which has a lower surface with increased adherability to other materials (e.g., adhesives). Treated, cured inner liners resulting from such methods as well as tires containing the treated inner liners.

25 Claims, No Drawings

(56) References Cited

U.S. PATENT DOCUMENTS

| | | |
|---|---|---|
| 6,505,455 B1 | 1/2003 | Georgeau |
| 6,530,409 B1 | 3/2003 | Ishikawa et al. |
| 6,679,018 B2 | 1/2004 | Georgeau et al. |
| 6,803,412 B2 | 10/2004 | Nguyen-Misra et al. |
| 6,923,233 B1 * | 8/2005 | Girault .................... B60C 13/00 |
| | | 152/155 |
| 7,073,550 B2 | 7/2006 | Reiter et al. |
| 7,175,732 B2 | 2/2007 | Robinson et al. |
| 7,182,114 B2 | 2/2007 | Yukawa |
| 7,189,781 B2 | 3/2007 | Acevedo et al. |
| 7,317,051 B2 | 1/2008 | Georgeau et al. |
| 7,484,544 B2 | 2/2009 | Serra et al. |
| 7,671,144 B2 | 3/2010 | Fujimoto et al. |
| 7,681,613 B2 | 3/2010 | Yukawa et al. |
| 7,717,146 B2 | 5/2010 | Yukawa et al. |
| 7,727,940 B2 | 6/2010 | Reddy et al. |
| 7,743,808 B2 | 6/2010 | Yukawa |
| 7,767,308 B2 | 8/2010 | Georgeau et al. |
| 7,772,301 B2 | 8/2010 | Fensel et al. |
| 8,028,796 B2 | 10/2011 | Ishihara |
| 8,221,849 B2 | 7/2012 | Naito |
| 8,245,743 B2 | 8/2012 | Hahn et al. |
| 8,534,331 B2 | 9/2013 | Dubos et al. |
| 8,999,093 B2 | 4/2015 | Yukawa |
| 9,108,373 B2 | 8/2015 | Tanno et al. |
| 2001/0000788 A1 | 5/2001 | Ono et al. |
| 2002/0059971 A1 * | 5/2002 | Yukawa .................... B60B 3/04 |
| | | 152/209.2 |
| 2002/0115770 A1 | 8/2002 | Georgeau et al. |
| 2004/0140030 A1 * | 7/2004 | Hahn ........................ B60C 1/00 |
| | | 152/152.1 |
| 2004/0214950 A1 | 10/2004 | Nakamura et al. |
| 2005/0098252 A1 | 5/2005 | Muraoka et al. |
| 2005/0107499 A1 | 5/2005 | Georgeau et al. |
| 2005/0143496 A1 | 6/2005 | Mueller |
| 2005/0155686 A1 | 7/2005 | Yukawa et al. |
| 2005/0221046 A1 | 10/2005 | Finerman |
| 2005/0284536 A1 | 12/2005 | Kojima et al. |
| 2006/0169393 A1 | 8/2006 | Botts et al. |
| 2006/0205907 A1 | 9/2006 | Guyer et al. |
| 2007/0088137 A1 | 4/2007 | Georgeau |
| 2007/0282080 A1 | 12/2007 | Kawakami et al. |
| 2008/0078489 A1 | 4/2008 | Fukutomi et al. |
| 2008/0237537 A1 | 10/2008 | Huang et al. |
| 2008/0292902 A1 | 11/2008 | Reid et al. |
| 2009/0005498 A1 | 1/2009 | Lin et al. |
| 2009/0018260 A1 | 1/2009 | Correia et al. |
| 2009/0023837 A1 | 1/2009 | Okamatsu et al. |
| 2009/0318599 A1 | 12/2009 | Brokamp |
| 2010/0043933 A1 | 2/2010 | Breunig |
| 2010/0068530 A1 | 3/2010 | Laubry |
| 2010/0173167 A1 | 7/2010 | Vissing et al. |
| 2010/0317796 A1 | 12/2010 | Huang et al. |
| 2011/0003920 A1 | 1/2011 | Matsuda et al. |
| 2011/0056694 A1 | 3/2011 | Sears et al. |
| 2011/0247674 A1 | 10/2011 | Fujii et al. |
| 2011/0308706 A1 | 12/2011 | Sandstrom et al. |
| 2012/0040191 A1 | 2/2012 | Kohl et al. |
| 2012/0123016 A1 | 5/2012 | Bolte et al. |
| 2012/0125507 A1 | 5/2012 | Bormann et al. |
| 2012/0234449 A1 | 8/2012 | Greiveldinger et al. |
| 2012/0232210 A1 | 9/2012 | Cheng et al. |
| 2013/0023617 A1 | 1/2013 | Okamoto |
| 2013/0032262 A1 | 2/2013 | Bormann et al. |
| 2013/0108882 A1 | 5/2013 | Stuart et al. |
| 2013/0192736 A1 | 8/2013 | Song et al. |
| 2013/0228259 A1 | 9/2013 | Breunig |
| 2013/0260146 A1 | 10/2013 | Wright et al. |
| 2014/0030537 A1 | 1/2014 | Ogasawara et al. |
| 2014/0110032 A1 | 4/2014 | Ogasawara et al. |
| 2014/0124114 A1 | 5/2014 | Hayashi et al. |
| 2014/0138004 A1 | 5/2014 | Voge et al. |
| 2014/0261965 A1 | 9/2014 | Tang et al. |
| 2014/0329102 A1 | 11/2014 | Randall et al. |
| 2015/0184045 A1 | 7/2015 | Goubard et al. |
| 2015/0284610 A1 | 7/2015 | Zander et al. |
| 2015/0273944 A1 | 10/2015 | Yukawa |
| 2015/0364720 A1 * | 12/2015 | Itoh ........................ B32B 27/06 |
| | | 428/446 |
| 2015/0368512 A1 | 12/2015 | Bowman et al. |
| 2016/0032158 A1 | 2/2016 | Tang et al. |
| 2016/0068031 A1 | 3/2016 | Kaszas et al. |
| 2016/0340905 A1 | 11/2016 | Tang et al. |
| 2016/0362893 A1 | 12/2016 | Tang et al. |
| 2017/0050474 A1 | 2/2017 | Laubry |
| 2017/0282647 A1 * | 10/2017 | Van Erp ................ B60C 1/0008 |
| 2017/0297281 A1 | 10/2017 | Yukawa et al. |
| 2018/0016400 A1 | 1/2018 | Gutacker et al. |
| 2018/0201774 A1 | 7/2018 | Sugimoto et al. |
| 2018/0208687 A1 | 7/2018 | Sugimoto et al. |
| 2019/0256745 A1 | 8/2019 | Goubard et al. |

FOREIGN PATENT DOCUMENTS

| | | |
|---|---|---|
| CN | 1259094 A | 7/2000 |
| CN | 1553866 A | 12/2004 |
| CN | 1669783 A | 9/2005 |
| CN | 1927608 A | 3/2007 |
| CN | 10103186 A | 7/2007 |
| CN | 101939349 A | 1/2011 |
| CN | 102548743 A | 7/2012 |
| CN | 103158437 A | 6/2013 |
| CN | 103502375 A | 1/2014 |
| CN | 103648798 A | 3/2014 |
| EP | 0135463 A1 | 3/1985 |
| EP | 0160614 A2 | 11/1985 |
| EP | 1174251 A2 | 1/2002 |
| EP | 1418199 A1 | 5/2002 |
| EP | 1090069 B1 | 7/2004 |
| EP | 1462500 A1 | 9/2004 |
| EP | 1544254 A1 | 6/2005 |
| EP | 2042296 A1 | 1/2009 |
| EP | 2335911 A1 | 6/2011 |
| EP | 2738017 A1 | 6/2014 |
| EP | 2993061 A1 | 3/2016 |
| EP | 3009473 A1 | 4/2016 |
| EP | 3093165 A1 | 11/2016 |
| FR | 2273682 A1 | 1/1976 |
| JP | S53-97046 A | 8/1978 |
| JP | S55-127212 A | 10/1980 |
| JP | S60-64834 A | 4/1985 |
| JP | H01-113483 A | 5/1989 |
| JP | H09-187869 A | 7/1997 |
| JP | 10087884 A | 4/1998 |
| JP | 2002-363484 A | 12/2002 |
| JP | 2006-007760 A | 1/2006 |
| JP | 2008133404 A | 6/2008 |
| JP | 2009-029972 A | 2/2009 |
| JP | 2009215497 A | 9/2009 |
| JP | 2009255601 A | 11/2009 |
| JP | 2010-106159 A | 5/2010 |
| JP | 2011-31709 A | 2/2011 |
| JP | 2015101672 A | 6/2015 |
| JP | 2015-131957 A | 7/2015 |
| JP | 2016-78817 A | 5/2016 |
| JP | 2016-514734 A | 5/2016 |
| JP | 2016-108540 A | 6/2016 |
| KR | 20020037593 A | 5/2002 |
| KR | 10-0982923 B1 | 9/2010 |
| WO | 9856598 A1 | 12/1998 |
| WO | 2000-37534 A1 | 6/2000 |
| WO | 2007/128797 A1 | 11/2007 |
| WO | 2008-013183 A1 | 1/2008 |
| WO | 2009-006915 A1 | 1/2009 |
| WO | 2009058420 A1 | 5/2009 |
| WO | 2014-095650 A1 | 8/2014 |
| WO | 2014-145482 A1 | 9/2014 |
| WO | 2014198432 A1 | 12/2014 |
| WO | 2015/075040 A1 | 3/2015 |
| WO | 2015074031 A1 | 5/2015 |
| WO | 2015/143065 A1 | 9/2015 |
| WO | 2015165899 A1 | 11/2015 |

(56) References Cited

FOREIGN PATENT DOCUMENTS

| WO | 2016-115560 A1 | 7/2016 |
| WO | 2016-146648 A1 | 9/2016 |

OTHER PUBLICATIONS

International Search Report and Written Opinion from PCT/US2017/066368 dated Apr. 10, 2018.
International Preliminary Report on Patentability from PCT/US2017/38493 dated Dec. 25, 2018.
International Preliminary Report on Patentability from PCT/US2017/39516 dated Jan. 1, 2019.
International Preliminary Report on Patentability from PCT/US2017/66271 dated Jun. 18, 2019.
International Preliminary Report on Patentability from PCT/US2017/40024 dated Jan. 1, 2019.
International Preliminary Report on Patentability from PCT/US2017/66368 dated Jun. 18, 2019.
International Preliminary Report on Patentability from PCT/US2017/66242 dated Jun. 18, 2019.
INEOS Oligomers—INDOL Polybutene Specifications and Typical, undated, downloaded Oct. 28, 2016.
Technical Information Sheet—QuickSeam Splice Tape, last modified Jul. 25, 2013.
Technical Information Sheet—EcoWhite QuickSeam Splice Tape, last modified Dec. 8, 2015.
International Search Report for Application No. PCT/US2014/030257 dated Sep. 17, 2014.
Written Opinion for Application No. PCT/US2014/030257 dated Sep. 2015.
Kristalex 3100 hydrocarbon resin data sheet; Eastman Chemical Company, 2019. (Year: 2019).
Written Opinion and IPRP for Application No. PCT/US2014/066101 dated May 2015.
International Search Report for Application No. PCT/US2014/066101 dated Jan. 27, 2015.
Kristalex 3100 hydrocarbon resin technical data sheet; Eastman Chemical Company; dated Feb. 28, 2018.
Shin Etsu, Silicone Release Coatings, Shin-Etsu Integrated System, dated Oct. 2012 (8 pages).
International Search Report from PCT application No. PCT/US2017/038493, dated Aug. 2017 (3 pages).
International Preliminary Report on Patentability and Written Opinion from PCT application No. PCT/US2017/038493, dated Dec. 2018 (10 pages).
3M, Low Fogging Adhesive Transfer Tapes, Technical Data, dated Oct. 2008 (4 pages).
Hepworth, Paul, Chemistry and Technology of Surfactants, Chapter 5 Non-ionic Surfactants, Copyright 2006.
Lee, Myung Jin, International Search Report with Written Opinion from PCT/US2017/039516, 12 pp. (dated Aug. 28, 2017).
Safety Data Sheet for QuickPrime Plus LVOC from Firestone Building Products Company, last revised Feb. 20, 2015.
Safety Data Sheet for QuickPrime Plus Primer from Firestone Building Products Company, last revised Jan. 29, 2016.
Safety Data Sheet for Single-Ply LVOC Primer from Firestone Building Products Company, last revised Mar. 11, 2014.
Safety Data Sheet for Single-Ply QuickPrime Primer from Firestone Building Products Company, last revised Jan. 28, 2013.
Technical Information Sheet for QuickPrime Plus LVOC from Firestone Building Products Company, last revised Feb. 13, 2012.
Technical Information Sheet for QuickPrime Plus from Firestone Building Products Company, last revised Aug. 2, 2013.
Technical Information Sheet for Single-Ply LVOC Bonding Adhesive-1168 from Firestone Building Products Company, last revised Jan. 17, 2012.
Technical Information Sheet for Single-Ply LVOC Bonding Adhesive from Firestone Building Products Company, last revised Sep. 17, 2015.
Technical Information Sheet for Single-Ply QuickPrime Primer from Firestone Building Products Company, last revised Feb. 21, 2012.
Lee, Myung Jin, International Search Report with Written Opinion from PCT/US2017/040024, 13 pp. (dated Aug. 28, 2017).
Jang, Gijeong, International Search Report with Written Opinion from PCT/US2017/066242, 13 pp. (dated Mar. 30, 2018).
Technical Information Sheet, EPDM—Solvent Free Bonding Adhesive, 4 pages, dated Nov. 7, 2016.
Technical Datasheet, Momentive SPUR 1050MM, dated Sep. 10, 2011.
Marketing Bulletin, Momentive SPUR 1050MM, dated Mar. 2017.
Technical Datasheet, Momentive SPUR 1015LM, dated Jan. 23, 2016.
Marketing Bulletin, Momentive SPUR 1015LM, dated Mar. 2017.
Kaneka MS Polymer, dated Dec. 9, 2016.
Technical Data Sheet, GENIOSIL STP E 30, dated Jul. 31, 2015.
Technical Data Sheet, GENIOSIL STP E 35, dated May 8, 2015.
European Extended Search Report and Search Opinion from EP application No. 17879667.8, transmitted by European Patent Office dated Jul. 30, 2020.
International Search Report from PCT/US2017/38493 dated Aug. 23, 2017.
International Search Report and Written Opinion from PCT/US2017/39516 dated Aug. 28, 2017.
International Search Report and Written Opinion from PCT/US2017/66242 dated Aug. 28, 2017.
International Search Report and Written Opinion from PCT/US2017/66242 dated Mar. 30, 2018.
European Extended Search Report and Search Opinion from EP application No. 17821258.5, transmitted by the European Patent Office dated Jan. 30, 2020.
European Extended Search Report and Search Opinion from EP application No. 17879743.7, transmitted by the European Patent Office dated Jul. 31, 2020.
European Extended Search Report and Search Opinion from EP application No. 17880817.6 transmitted by the European Patent Office dated Jul. 13, 2020.
Wei, Junneng (editor), User Manual for construction Machinery Tires, published 1986 by China Railway Press, Beijing, pp. 259-263.
Wang, Mengjiao et al. (editors), Handbook of Rubber Industry, 2nd volume copyright 1989, pp. 141 and 507-511.

\* cited by examiner

METHODS FOR TREATING INNER LINER SURFACE, INNER LINERS RESULTING THEREFROM AND TIRES CONTAINING SUCH INNER LINERS

CROSS-REFERENCE TO RELATED APPLICATIONS

This application claims priority to and any other benefit of U.S. Provisional Patent Application Ser. No. 62/352,621, filed on Jun. 21, 2016 and entitled "Methods For Treating Inner Liner Surface, Inner Liners Resulting Therefrom And Tires Containing Such Inner Liners," the entire disclosure of which is incorporated by reference herein.

FIELD

The present application is directed to methods for treating the surface of a cured inner liner; to treated, cured inner liners resulting from such methods; and to tires containing the treated inner liners.

BACKGROUND

When an uncured tire is placed into a tire mold for curing, the radially innermost component of the tire is often the inner liner. During the curing process that takes place in the tire mold, a bladder is inflated and presses against the radially inward-facing surface of the inner liner (the lower surface of the inner liner). In order to prevent sticking (or co-curing) of the lower surface of the inner liner to the bladder, a polysiloxane-containing release is often applied to the lower surface of inner liner (prior to the tire body being placed into the tire mold). While the polysiloxane-containing release provides the advantage of preventing sticking of the inner liner surface to the bladder in the tire mold, it is disadvantageous after the cured tire is removed from the mold because it remains upon the lower surface of the cured inner liner (as part of the rubber) and inhibits adhesion of other materials to the lower surface.

SUMMARY

Disclosed herein are methods for treating the surface of a cured inner liner; treated, cured inner liners resulting from such methods; and tires containing the treated inner liners.

In a first embodiment, a method for treating the surface of a cured inner liner is disclosed. The method comprises providing a cured inner liner having an upper and a lower surface wherein the inner liner comprises rubber a majority by weight of which comprises butyl rubber (optionally halogenated) and the lower surface further comprises polysiloxane moieties, treating the lower surface of the cured inner liner to convert at least a portion of the polysiloxane moieties to silanol moieties, thereby producing a treated, cured inner liner.

In a second embodiment, a method for treating the surface of a cured inner liner is disclosed. The method comprises providing a cured inner liner having an upper and a lower surface wherein the inner liner comprises rubber a majority by weight of which comprises butyl rubber (optionally halogenated) and the lower surface further comprises polysiloxane moieties, and treating the lower surface of the cured inner liner to increase its hydrophilicity by oxidizing at least a portion of the polysiloxane moieties, thereby producing a treated, cured inner liner.

In a third embodiment, a treated, cured inner liner is disclosed which comprises rubber a majority by weight of which comprises butyl rubber (optionally halogenated) and having an upper and a lower surface wherein the lower surface further comprises silicon atoms within silanol moieties.

In a fourth embodiment, a cured tire is disclosed. The cured tire comprises a treated, cured inner liner comprising rubber a majority by weight of which comprises butyl rubber (optionally halogenated) and having an upper and a lower surface wherein the lower surface is radially inward facing and further comprises silicon atoms within silanol moieties; at least one component radially inner of the inner liner; and optionally an adhesive layer between the lower surface of the inner liner and the at least one radially inner component.

DETAILED DESCRIPTION

Disclosed herein are methods for treating the surface of a cured inner liner; treated, cured inner liners resulting from such methods; and tires containing the treated inner liners.

In a first embodiment, a method for treating the surface of a cured inner liner is disclosed. The method comprises providing a cured inner liner having an upper and a lower surface wherein the inner liner comprises rubber a majority by weight of which comprises butyl rubber (optionally halogenated) and the lower surface further comprises polysiloxane moieties, treating the lower surface of the cured inner liner to convert at least a portion of the polysiloxane moieties to silanol moieties, thereby producing a treated, cured inner liner.

In a second embodiment, a method for treating the surface of a cured inner liner is disclosed. The method comprises providing a cured inner liner having an upper and a lower surface wherein the inner liner comprises rubber a majority by weight of which comprises butyl rubber (optionally halogenated) and the lower surface further comprises polysiloxane moieties, and treating the lower surface of the cured inner liner to increase its hydrophilicity by oxidizing at least a portion of the polysiloxane moieties, thereby producing a treated, cured inner liner.

In a third embodiment, a treated, cured inner liner is disclosed which comprises rubber, a majority by weight of which comprises butyl rubber (optionally halogenated) and having an upper and a lower surface wherein the lower surface further comprises silicon atoms within silanol moieties. In certain embodiments of the third embodiment, the inner liner can be understood as resulting from a method according to the first embodiment or a method according to the second embodiment.

In a fourth embodiment, a cured tire is disclosed. The cured tire comprises a treated, cured inner liner comprising rubber a majority by weight of which comprises butyl rubber (optionally halogenated) and having an upper and a lower surface wherein the lower surface is radially inward facing and further comprises silicon atoms within silanol moieties; at least one component radially inner of the inner liner; and optionally an adhesive layer between the lower surface of the inner liner and the at least one radially inner component.

Definitions

The terminology as set forth herein is for description of the embodiments only and should not be construed as limiting the invention as a whole.

As used herein, the term "majority" means more than 50% (e.g., 50.5%, 51%, 60%, etc.) and may encompass 100%.

As used herein, the term "natural rubber" means naturally occurring rubber such as can be harvested from sources such as Hevea rubber trees and non-Hevea sources (e.g., guayule shrubs and dandelions such as TKS). In other words, the term "natural rubber" should be construed so as to exclude synthetic polyisoprene.

As used herein, the term "phr" means parts per one hundred parts rubber. In certain embodiments, the 100 parts rubber should be understood to refer to 100 parts of the at least one diene based elastomer. 100 parts of rubber may also be referred to as 100 phr.

As used herein the term "polyisoprene" means synthetic polyisoprene. In other words, the term is used to indicate a polymer that is manufactured from isoprene monomers, and should not be construed as including naturally occurring rubber (e.g., Hevea natural rubber, guayule-sourced natural rubber, or dandelion-sourced natural rubber). However, the term polyisoprene should be construed as including polyisoprenes manufactured from natural sources of isoprene monomer.

Treated, Cured Inner Liner

As discussed above, the methods of the first and second embodiments disclosed herein are directed to treating the surface of a cured inner liner, more specifically the lower surface of the cured inner liner. Additionally, the third and fourth embodiments disclosed herein also pertain to a cured inner liner (and a tire comprising a cured inner liner) which comprises rubber, a majority by weight of which comprises butyl rubber (optionally halogenated) and has an upper and a lower surface wherein the lower surface further comprises silicon atoms within silanol moieties; in certain embodiments of the third and fourth embodiments, the lower surface can be understood as a treated lower surface, and in certain such embodiments has been treated in accordance with a method according to the first or second embodiments disclosed herein. The cured inner liner refers to the cured version of an inner liner which generally is cured in a tire mold as part of the tire making process. According to the first and second embodiments, the cured inner liner that is provided may be part of a tire. The cured inner liner is referred to as treated since its non-stick or "release" polysiloxane-containing lower surface has been treated improve its adherability to other materials (e.g., an adhesive such as a PSA). By adherability is meant the ability of other materials to adhere to the lower surface of the treated, cured inner liner.

According to the first-fourth embodiments, the treated, cured inner liner (as well as the cured inner liner which is then treated) comprises rubber, a majority by weight of which butyl rubber which is optionally halogenated. In other words, the treated, cured inner liner (and/or the cured inner liner) comprises rubber, and a majority by weight of the rubber of such inner liner comprises one or more butyl rubbers and each of those butyl rubbers is optionally halogenated. (As discussed below, in certain embodiments of the first-fourth embodiments, the treated, cured inner liner (and/or the cured inner liner) further comprises one or more fillers and optionally one or more curatives mixed with the butyl rubber(s).) Butyl rubber is a copolymer of isobutylene and a small amount of a diene-based monomer, typically isoprene or para-methylstyrene. The polymer chains of butyl rubber therefore typically have a highly saturated backbone. Butyl rubber typically contains more than about 90% isobutylene and less than about 10% diene-based monomer (e.g., isoprene or para-methylstyrene) by weight in the copolymer, including about 90-99.5% isobutylene and about 10 to about 0.5% diene-based monomer, about 95-99.5% isobutylene and about 5-0.5% diene-based monomer, about 96-99% isobutylene and about 4-1% diene-based monomer, about 97-98.5% isobutylene and about 1.5-3% diene-based monomer, and including about 98% isobutylene and about 2% diene-based monomer by weight in the copolymer. Typically, the diene-based mer (e.g., isoprenyl or para-methylstyrenyl) units are distributed randomly in the polymer chains of butyl rubber. Non-limiting examples of suitable polymers for use as the at least one butyl rubber or a halogenated butyl rubber according to certain embodiments of the first-fourth embodiments disclosed herein include, but are not limited to, butyl rubber, chlorobutyl rubber, bromobutyl rubber, fluorobutyl rubber, iodobutyl rubber, copolymers thereof, and combinations thereof. In certain embodiments of the first-fourth embodiments, the treated, cured inner liner (and/or the cured inner liner) comprises bromobutyl rubber. In certain embodiments of the first-fourth embodiment, the only rubber present in the treated, cured inner liner (and/or the cured inner liner) is bromobutyl rubber (i.e., of 100 parts or 100 phr of rubber present in the cured inner liner all 100 parts or 100 phr is bromobutyl rubber).

In certain embodiments of the first-fourth embodiments disclosed herein, the treated, cured inner liner (and/or the cured inner liner) comprises other ingredients in addition to the optionally halogenated butyl rubber(s). These other ingredients of the cured inner liner may vary but will generally include one or more fillers (e.g., carbon black, clay or silica) and a cure package (e.g., a vulcanizing agent such as sulfur and one or more vulcanization accelerators). In certain embodiments of the first-fourth embodiments disclosed herein, the cured inner liner comprises one or more butyl rubbers (optionally halogenated) and 10-100 phr (including 20-80 phr, 30-70 phr, 15 phr, 20 phr, 30 phr, 40 phr, 50 phr, 60 phr, 70 phr, 80 phr, 90 phr, etc.) of one or more of the foregoing fillers. In certain embodiments of the first-fourth embodiments, the rubber of the cured, treated inner liner (and/or the cured inner liner) comprises at least 60% by weight (e.g., 60%, 65%, 70%, 75%, 80%, 85%, 90%, 95% or 100% by weight) of at least one of: a butyl rubber or halogenated butyl rubber (or a combination thereof, as discussed above). In certain embodiments of the first-fourth embodiments, the rubber of the treated, cured inner liner (and/or cured inner liner) comprises at least one of the following rubbers in addition to the butyl or halogenated butyl rubber(s): natural rubber, polyisoprene, styrene-butadiene rubber, isoprene rubber, polybutadiene rubber, nitrile rubber (acrylonitrile-butadiene copolymers), or hydrogenated nitrile rubber.

According to the first-fourth embodiments disclosed herein, the lower surface of the cured inner liner (before treatment) also comprises polysiloxane moieties. These polysiloxanes moieties are present as a result of application of a release treatment containing polysiloxane to the lower surface of the cured inner liner or to a curing bladder; generally, such release treatments are applied either to the inner liner surface, to the curing bladder surface, or to both, to reduce the likelihood of the inner liner curing to the surface of the curing bladder during the tire molding process. As used herein, a polysiloxane moiety refers to the structure I, as follows: —[Si—O]$_x$—. Thus, by referring to polysiloxane moieties is meant that x is an integer of at least 2. In certain embodiments of the first-fourth embodiments, x is an integer of at least 50. In certain embodiments of the first-fourth embodiments, x is an integer ranging from 2 to 400 (e.g., 2, 5, 10, 20, 30, 40, 50, 75, 100, 150, 200, 250, 300, 350, 400), including 2 to 350, 2 to 300, 2 to 250, 2 to 200, 2 to 150, 2 to 100, 2 to 75, 2 to 50, 5 to 350, 5 to 300, 5 to 250, 5 to 200, 5 to 150, 5 to 100, 5 to 75, 5 to 50, 10 to 350, 10 to 300, 10 to 250, 10 to 200, 10 to 150, 10 to 100, 10 to 75, 10 to 50, 50 to 400, 50 to 350, 50 to 300, 50 to 250, or 50 to 200. As those of skill in the art will appreciate, each Si in structure I is capable of forming four bonds in total and, thus, each intermediary Si (e.g., when x=4 this would be the $2^{nd}$ and $3^{rd}$ Si) is bonded to two hydrocarbyl groups and each terminal Si (e.g., when x=4 this would be the $1^{st}$ and $4^{th}$ Si) is bonded to two hydrocarbyl groups and one additional terminal group. Such polysiloxanes can be referred to as diorganopolysiloxanes. Notably, according to the first-fourth embodiments, the two "organo" groups to which each intermediary Si is bonded need not be the same and each intermediary Si need not be bonded to the same two organo groups or the same combination of two organo groups. In certain embodiments of the first-fourth embodiments, the hydrocarbyl groups to which each intermediary Si is bonded comprises a methyl group; such a polysiloxane can be referred to as polydimethylsiloxane. Other exemplary polysiloxanes for use in effecting a release property to the lower surface of the inner liner during tire molding include, but are not limited to, dialkylpolysiloxanes such as diethylpolysiloxane, rnethylisopropylpolysiloxane, and methyldodecylpolysiloxane; diarylpolysiloxanes such as diphenylpolysiloxane; alkylphenylpolysiloxanes such as methylphenylpolysilaxane, dimethylsiloxane-methylphenylsiloxane copolymers, and dimethylsiloxane-diphenylsiloxane copolymers; alkylaralkylpolysiloxanes such as methyl(phenylethyl)polysiloxane and methyl(phenylpropyl) polysiloxane; and 3,3,3-trifluoropropylmethylpolysiloxane. The two organo groups on the intermediary Si and on the terminal Si of the polysiloxane may be independently selected from linear or branched alkyl having optionally substituted with at least one halogen (e.g., fluorine), and cycloalkyl having C3-C8. In certain embodiments of the first-fourth embodiments, each terminal Si of the polysiloxane chain is endblocked by a hydroxyl group, a hydrocarbyl group, or an alkoxy group.

Treatment of the lower surface of the cured inner liner (i.e., by the methods of the first embodiment disclosed herein) converts at least a portion of the polysiloxane moieties (present on the lower surface of the cured inner from the release treatment) to silanol moieties. As used herein, the term silanol moieties encompasses Si—OH, Si—OR—OH and Si—R—OH. As a non-limiting example, in a given polysiloxane moiety subjected to the treatment, instead of intermediary Si atoms each being bonded to two methyl groups, at least a portion of those methyl groups are converted to silanol moieties (e.g., Si—OH, Si—OCH$_2$OH and/or Si—CH$_2$—OH). A given Si can be considered to be "converted" to a silanol moiety if it is bonded to at least one more silanol moiety after treatment than it was bonded to prior to treatment. As non-limiting examples, a terminal Si would be considered converted if at least one of its organo groups was converted to a silanol moiety (even if its other or terminal group was already a silanol) and an intermediary Si would be considered converted if at least one of its organo groups was converted to a silanol moiety. Treatment of the lower surface of the cured inner liner (i.e., by the methods of the second embodiment disclosed herein) oxidizes at least a portion of the polysiloxane moieties (present from the release treatment). According to the methods of the second embodiment, the oxidation of a polysiloxane moiety may result in a silanol moiety, having a structure as discussed above. The treatment according to the methods of either the first or second embodiment has the effect of changing the surface properties of the lower surface of the cured inner liner from a release surface to a treated surface capable of adhering to another surface or material (e.g., an adhesive such as an acrylate polymer, or even a rubber sealant layer), which as discussed below can also be described as increasing adherability. In certain embodiments of the first and second embodiments, after the treatment of the lower layer surface, a majority by weight of the silicon atoms present in the treated lower layer of the inner liner are contained within silanol moieties; in certain such embodiments, at least 55%, at least 60%, at least 65%, at least 70%, at least 75%, at least 80%, at least 85%, at least 90%, at least 95%, at least 98%, at least 99%, or even 100% by weight of the silicon atoms present in the treated lower layer of the inner liner are contained within silanol moieties. The other silicon atoms present in the treated lower layer of the inner liner can be understood as being contained within polysiloxane moieties (i.e., —O—Si—O—Si—, with the third bond of the Si being to an R group). In certain embodiments of the third and fourth embodiments disclosed herein, the lower layer of the cured inner liner can be understood as having a majority by weight of its silicon atoms contained within silanol moieties; in certain such embodiments, at least 55%, at least 60%, at least 65%, at least 70%, at least 75%, at least 80%, at least 85%, at least 90%, at least 95%, at least 98%, at least 99%, or even 100% by weight of the silicon atoms present in the treated lower layer of the inner liner are contained within silanol moieties. The presence and relative percentage content of the different Si-containing moieties (i.e., silanol moieties and polysiloxane moieties) can be measured using various analytical procedures, non-limiting examples of which include NMR (nuclear magnetic resonance spectroscopy), IR (infrared spectroscopy), and XPS (x-ray photoelectron spectroscopy).

While a treated, cured inner liner is referred to herein with respect to the first-fourth embodiments, it should be understood that the treated surface is the radially inward facing surface of the inner liner (referred to herein as the lower surface). The treatment (or treated portion) may penetrate or extend slightly below (or into) the rubber surface (e.g., 5-10% of the thickness) which is sufficient to reach the polysiloxane-moieties that have been applied to the inner liner to produce a release or non-stick surface since these moieties also only penetrate slightly below or into the surface. As a non-limiting example, in a standard inner liner which may range in thickness from 0.5-2 mm, the treatments disclosed herein might penetrate 0.02-0.2 mm below (or into) the surface of the inner liner.

Treating the Lower Surface of the Cured Inner Liner

As discussed above, the first and second embodiments disclosed herein are directed to methods for treating the surface of a cured inner liner, more specifically, the lower surface of the cured inner liner. The lower surface of the cured inner liner that is treated according to the methods of the first and second embodiments refers to the surface that will be positioned radially inward facing when the treated inner liner is incorporated into a tire; thus, in certain embodiments of the first and second embodiments, the lower surface of the cured inner liner that is treated may be referred to as the radially inward facing surface of the inner liner. As discussed above, it is a cured version (as opposed to an uncured version) of the inner liner that has its lower surface treated. Moreover, in addition to being a cured inner liner that has its lower surface treated, the lower surface of the cured inner liner can also be understood as having been previously subjected to a release treatment, as discussed above, such that it contains polysiloxane moieties; such a release treatment generally comprises the application of a polysiloxane-containing solution onto the rubber of the lower surface of the uncured inner liner, resulting (upon evaporation or drying of any solvent) in polysiloxane moieties within the rubber of the lower surface of the inner liner (and slightly below (or into) the rubber surface). Generally, the release treatment will not comprise a separate layer of silicone rubber added to the lower surface of the uncured inner liner.

According to the first embodiment, the treating converts at least a portion of the polysiloxane moieties on the lower surface of the cured inner liner to silanol moieties. According to the second embodiment, the treating of the lower surface oxidizes at least a portion of the polysiloxane moieties, thereby increasing the hydrophilicity of the treated lower surface of the inner liner. In certain embodiments of the methods of the first and second embodiments, the portion of polysiloxane moieties converted or the portion of polysiloxane moieties oxidized comprises a majority of the silicon atoms within present, as discussed herein. In certain embodiments of the methods of the first and second embodiments, the treating comprises irradiating the lower surface of the cured inner liner with radiation having a specified wavelength. In certain embodiments of the first and second embodiments, the treating comprises irradiating the lower surface of the cured inner liner with radiation having a wavelength of less than 400 nm; in certain such embodiments, such radiation can be understood as comprising UV radiation, as further described below.

Exposing the Lower Surface to Radiation

According to certain embodiments of the methods of the first and second embodiments disclosed herein, treating the lower surface of the cured inner liner comprises exposing the lower surface of the cured inner liner to radiation having a wavelength of less than 400 nm. In certain embodiments of the methods of the first and second embodiments, the radiation can be understood as comprising UV radiation (e.g., UV-A, UV-B, or UV-C). As used herein, UV-A refers to radiation having a wavelength of 400-315 nm, UV-B refers to radiation having a wavelength of 315-280 nm, and UV-C refers to radiation having a wavelength of 280-200 nm. In certain embodiment of the methods of the first and second embodiments, the radiation comprises radiation having a wavelength of 400-280 nm. In certain embodiment of the methods of the first and second embodiments, the radiation comprises UV-B radiation or radiation having a wavelength of 315-280 nm.

According to the methods of the first and second embodiments disclosed herein, the source of the radiation may vary. In certain embodiments of the first and second embodiments disclosed herein, the source of radiation comprises a lamp; in certain such embodiments, the lamp may be contained in a housing which serves to protect the lamp and/or direct the radiation emitted by the lamp in a desired direction or directions. Various commercial sources of lamps suitable for use in the methods of the first and second embodiments are available. As a non-limiting example, Uvitron International, Inc. (West Springfield, Mass.) provides portable light curing systems containing either a 400 W or 600 W lamp enclosed in a housing having a handle, under their tradename Port-aRay. In certain embodiments of the first and second embodiments disclosed herein, the lamp (or an assembly of lamps) is mounted and the lower surface of the cured inner liner is passed underneath the lamp using a conveyor belt or other similar apparatus. According to the methods of the first and second embodiments disclosed herein, when a lamp is used as the source of radiation, the power (wattage) of the lamp may vary; in certain such embodiments the lamp has a power of 100-1000 Watts (e.g., 100, 200, 300, 400, 500, 600, 700, 800, 900, or 1000 Watts), 200-800 Watts, or 400-600 Watts. According to certain embodiments of the methods of the first and second embodiments disclosed herein, the foregoing wattages or wattage ranges are employed in conjunction with a method wherein the lamp and the lower surface of the inner liner are separated by a distance discussed below and/or in conjunction with a method wherein the exposure to radiation occurs for one of the times or time ranges discussed above.

According to the methods of the first and second embodiments disclosed herein, the amount of time that the lower surface of the cured inner liner is subjected to (or exposed to) radiation may vary. The amount of time can be varied depending upon the dose of radiation to which the lower surface of the cured inner liner is to be subjected (with higher doses generally requiring longer times). Similarly, the amount of time can be varied depending upon the power of the lamp utilized (with higher wattages generally requiring shorter times) and the distance between the lower surface of the cured inner liner and the lamp (with shorter distances generally requiring shorter times). In certain embodiments of the methods of the first and second embodiments, the amount of time that the lower surface of the cured inner liner is subjected to (or exposed to) radiation is about 0.1 to about 10 minutes (e.g., 0.1 minutes, 0.2 minutes, 0.25 minutes, 0.5 minutes, 1 minute, 1.25 minutes, 1.5 minutes, 2 minutes, 3 minutes, 4 minutes, 5 minutes, 6 minutes, 7 minutes, 8 minutes, 9 minutes, or 10 minutes), 0.1-10 minutes, about 0.1 to about 5 minutes, 0.1-5 minutes, about 0.2 to about 2 minutes, 0.2-2 minutes, about 0.25 to about 2 minutes, 0.25-2 minutes, about 0.25 to about 1 minute, 0.25-1 minute, about 1 minute to about 10 minutes, 1-10 minutes, about 2 minutes to about 10 minutes, 2-10 minutes, about 5 minutes to about 10 minutes, or 5-10 minutes. According to certain embodiments of the methods of the first and second embodiments disclosed herein, the foregoing times are employed in conjunction with a lamp having a power according to one of the wattages or wattage ranges discussed above, and/or in conjunction with a method wherein the lamp and the lower surface of the inner liner are separated by a distance discussed below.

According to the methods of the first and second embodiments disclosed herein, when a lamp is utilized for exposing the lower surface of the cured inner liner to radiation, the distance between the lower surface of the cured inner liner and the lamp may vary. According to certain embodiments of the methods of the first and second embodiments, the distance between the lower surface of the cured inner liner and the lamp is about 1 cm to about 15 cm (e.g., 1 cm, 2 cm, 3 cm, 4 cm, 5 cm, 6 cm, 7 cm, 8 cm, 9 cm, 10 cm, 11 cm, 12 cm, 13 cm, 14 cm, 15 cm), 1-15 cm, about 1 cm to about 12 cm, 1-12 cm, about 1 cm to about 10 cm, 1-10 cm, about 1 cm to about 8 cm, 1-8 cm, about 5 cm to about 15 cm, 5-15 cm, about 5 cm to about 12 cm, 5-12 cm, about 5 cm to about 10 m, 5-10 cm, about 5 cm to about 7 cm, or 5-7 cm. According to certain embodiments of the methods of the first and second embodiments disclosed herein, the foregoing distances are employed in conjunction with a lamp having a power according to one of the wattages or wattage ranges discussed above and/or in conjunction with a method wherein the exposure to radiation occurs for one of the times or time ranges discussed above.

Applying Inorganic Oxidant

According to certain embodiments of the methods of the first and second embodiments disclosed herein, treating the lower surface of the cured inner liner comprises applying at least one inorganic oxidant to the lower surface of the cured inner liner. The inorganic oxidant or inorganic oxidants that are utilized in the methods of the first and second embodiments may vary in composition. In certain embodiments of the methods of the first and second embodiments the inorganic oxidant comprises at least one of the following: ozone, singlet oxygen, a peroxide, or a superoxide. According to the foregoing, one or more than one type of inorganic oxidant may be utilized and for each type utilized one more or more than one compound thereof may be utilized. In certain embodiments of the methods of the first and second embodiments, the at least one inorganic oxidant comprises hydrogen peroxide, an alkali metal peroxide, an alkali hypochlorite, an alkaline earth metal peroxide, a metal superoxide, or a combination thereof. In certain embodiments of the methods of the first and second embodiments, the at least one inorganic oxidant comprise hydrogen peroxide. When the at least one inorganic oxidant comprises an alkali metal or alkaline earth metal peroxide it may be selected from the following non-limiting examples: sodium peroxide, sodium hypochlorite, barium peroxide, magnesium peroxide, lithium peroxide, strontium peroxide, calcium peroxide, potassium peroxide, zinc peroxide, potassium permanganate, cesium peroxide, rubidium peroxide, and combinations thereof. When the at least one inorganic oxidant comprises a superoxide it may be selected from the following non-limiting examples: potassium superoxide, rubidium superoxide, cesium superoxide, sodium superoxide, sodium persulfate, ammonium persulfate, potassium persulfate, potassium peroxymonosulfate, sodium peroxiomonosulfate, and combinations thereof.

According to the methods of the first and second embodiments disclosed herein, when at least one inorganic oxidant is utilized to treat the lower surface of the cured inner liner, that inorganic oxidant or inorganic oxidants may be applied to the lower surface of the cured inner liner according to various methods. Preferably, the at least one inorganic antioxidant is solubilized in a solvent prior to being applied to the lower surface of the cured inner liner. In certain embodiments of the methods of the first and second embodiments disclosed herein, the at least one inorganic antioxidant is solubilized in a solution prior to being applied to the lower surface of the cured inner liner. In certain such embodiments, the solution comprises an aqueous solution and in other embodiments a hydrocarbon solution. According to the methods of the first and second embodiments, various methods can be used to apply to solution containing the at least one inorganic oxidant to the lower surface of the cured inner liner; non-limiting examples of these methods include spraying, dipping, and pouring. According to the methods of the first and second embodiments, when a solution containing the at least one inorganic oxidant is applied to the lower surface of the cured inner liner, the solvent contained therein may be evaporated therefrom by allowing it to air dry, or by the application of blowing air, heat, vacuum or a combination of the foregoing.

Increasing Hydrophilicity

As described above, according to the methods of the second embodiment, the lower surface of the cured inner liner is treated to increase its hydrophilicity by oxidizing at least a portion of the polysiloxane moieties contained within the cured inner liner. The increase in hydrophilicity can be understood as resulting from a conversion of at least a portion of the polysiloxane moieties to silanol moieties (as discussed above). The increase in hydrophilicity can be measured by measuring the contact angle of drops of deionized water placed on the surface of a treated, cured inner liner. The contact angle can be measured using various commercially available machinery (e.g., a Rame-Hart Model 500 Advanced Goniometer). In general, when the measured contact angle of deionized water is less than 90°, a surface can be considered relatively hydrophilic and when the measured contact angle is greater than 90°, a surface can be considered relatively hydrophobic. Thus, an increase in hydrophilicity will be represented by a decrease in contact angle (e.g., when comparing the lower surface of the cured inner liner before treatment to after treatment). In certain embodiments of the methods of the second embodiment, the increase in hydrophilicity is at least 5%, at least 10%, at least 15%, at least 20% or more (e.g., as can be measured by a corresponding decrease in the contact angle) as compared to the lower surface of the cured inner liner before treatment). In certain embodiments of the methods of the second embodiments, the increase in hydrophilicity represents a change in contact angle from greater than 90° (before treatment) to less than 90° (after treatment).

Cured Tire

In a fourth embodiment, a cured tire is disclosed. The cured tire comprises a cured inner liner comprising rubber a majority by weight of which comprises butyl rubber (optionally halogenated) and having an upper and a lower surface wherein the lower surface is radially inward facing and further comprises silicon atoms within silanol moieties; at least one component radially inner of the inner liner; and optionally an adhesive layer between the lower surface of the inner liner and the at least one radially inner component. In certain embodiments of the fourth embodiment, the cured tire can be understood as incorporating the cured inner liner of the third embodiment. In certain embodiments of the fourth embodiment, the cured tire can be understood as incorporating a cured inner liner resulting from a method according to the first or second embodiments disclosed herein.

In certain embodiments of the fourth embodiment, the cured tire further comprises at least one of: a tread, one or more body plies, a cap ply, or a sidewall. In certain embodiments of the fourth embodiment, the cured tire is a pneumatic tire.

According to the fourth embodiment, the at least one component radially inner of the inner liner may vary. In certain embodiments of the fourth embodiment, the at least one component comprises: a noise barrier, a sealant layer, an air barrier layer, a run-flat insert, an electronic communication module or a combination thereof. As discussed above, according to the fourth embodiment, the cured tire optionally comprises (optionally includes) an adhesive layer between the lower surface of the inner liner and the at least one radially inner component. In certain embodiments of the fourth embodiment, the cured tire comprises an adhesive layer between the lower surface of the inner liner and the at least one radially inner component. In certain embodiments of the fourth embodiment, the cured tire lacks (i.e., does not include) an adhesive layer between the lower surface of the inner liner and the at least one radially inner component; in other words, in such embodiments the at least one radially inner component directly contacts the lower surface of the treated, cured inner liner.

In certain embodiments of the fourth embodiment, the at least one component comprises a noise barrier, preferably with an adhesive layer between the noise barrier and the lower surface (radially inner surface) of the inner liner; in certain such embodiments, the noise barrier comprises a foam noise barrier. The noise barrier or foam noise barrier (when present) may be made from various materials. Generally, a light-weight and low-density flexible material such as foamed rubber, foamed synthetic resin, or cellular plastic will be utilized for a foam noise barrier. According to the fourth embodiment, the foam noise barrier (when present) may comprise a foamed material (or spongy materials) that is either an open-cell type or a closed-cell type, although open-cell types are preferred. As non-limiting examples, the material of the foam noise barrier (when present) may comprise a synthetic resin foam such as ether based polyurethane foam, ester based polyurethane foam, polyethylene foam and the like; rubber foam such as chloroprene rubber foam, ethylene-propylene rubber foam, nitrile rubber foam, silicone rubber foam, or a combination thereof. In certain embodiments of the fourth embodiment, the foam noise barrier (when present) comprises polyethylene foam, polyurethane foam, or a combination thereof. Generally, when a noise barrier (or foam noise barrier) is utilized in a tire, some type of adhesive will be used to adhere the noise barrier (or foam noise barrier) to the radially inner surface of the tire (e.g., the inner liner or a body ply having a spray-on air barrier or sealant) so as to minimize movement of the noise barrier within the tire. This adhesive may be applied to the noise barrier (or foam noise barrier), to the radially inner surface of the tire to which the foam barrier (or foam noise barrier) will be adhered, or to both. In certain embodiments of the fourth embodiment, the noise barrier or foam noise barrier (when present) is adhered to the radially inner surface of the tire using a pressure sensitive adhesive (PSA); the pressure sensitive adhesive may be applied in various forms such as by coating (e.g., by dipping, rolling on, pressing on), extruding on, or by use of a PSA tape. Various materials may be used for the adhesive to adhere the noise barrier (or foam noise barrier) to the radially inner surface of the tire, and suitable adhesives, including suitable pressure sensitive adhesives, are known and commercially available. Generally, the adhesive should be compatible with the materials of the tire (e.g., the component to whose radially inner surface the noise barrier or foam noise barrier is adhered). In certain embodiments of the fourth embodiment, the adhesive for the noise barrier (or foam noise barrier) comprises at least one of the following: (1) rubber (e.g., natural rubber, butyl rubber, halobutyl rubber, polybutadiene rubber, styrene-butadiene rubber, or a combination thereof), (2) acrylic polymer (e.g., an acrylate made by copolymerizing one or more acrylic ester with one or more other monomers or one of those discussed above), (3) silicone rubber, (4) polyether adhesive, (5) polyurethane polymer; in certain such embodiments, the adhesive is a PSA. In certain embodiments of the fourth embodiment, when the noise barrier or foam noise barrier is present, the adhesive used to adhere the noise barrier or foam noise barrier and the adhesive polymer used in the release layer are comprised of the same type of polymer (e.g., both contain an acrylate polymer).

In certain embodiments of the fourth embodiment, the at least one component radially inner of the inner liner comprises a sealant layer, preferably without any adhesive layer between the sealant layer and the lower surface of the inner liner (i.e., the sealant layer directly contacts the lower surface of the inner liner). In certain embodiments of the fourth embodiment, the sealant is applied to the tire inner liner and functions to seal a puncture (e.g., from a nail) and prevent air from leaking from the tire (or at least slow the air leakage) after the puncture.

In certain embodiments of the fourth embodiment, the at least one component radially inner of the inner liner comprises an air barrier layer, preferably without any adhesive layer between the air barrier layer and the lower surface of the inner liner (i.e., the air barrier directly contacts the lower surface of the inner liner). In certain embodiments, the air barrier layer is applied as a spray-on material and functions to enhance the air impermeability of the inner liner, thereby better retaining air within a pneumatic tire.

In certain embodiments of the fourth embodiment, the at least one component radially inner of the inner liner comprises a run-flat insert. In certain such embodiments, the run-flat insert comprises a self-supporting run-flat insert such as may be used in the sidewall of a tire to produce a run-flat tire or self-supporting run-flat tire. A run-flat insert that is used in the sidewall of a tire may be positioned either axially inward or axially outward of the body ply. In certain embodiments of the fourth embodiments, the run-flat insert will comprise the radially innermost (or axially innermost) component in the sidewall portion of the tire; in certain such embodiments, the inner liner will comprise the radially innermost component in the remaining portion of the tire.

In certain embodiments of the fourth embodiment, the at least one component radially inner of the inner liner comprises an electronic communication module. In certain embodiments of the fourth embodiment, the electronic communication module comprises a radio device; in certain such embodiments, at least a portion of the outer surface of the radio device is surrounded by a rubber coating. As used herein, the term radio device should be understood to include any suitable radio device known in the art capable of storing information (i.e., data), communicating information, or both storing and communicating information with another device. In certain embodiments of the fourth embodiment, the radio device disclosed herein is capable of conveying information. The conveying of information by the radio device comprises the receipt of a radio signal combined with transponding (by reflecting) a portion of the received radio signal back to a reader with a signal modulated by varying the radio device's antenna impedance. Generally, such a radio device which conveys information by transponding in response to being activated by energy (e.g., electromagnetic waves) sent by an external, remote transponder (e.g., an interrogator-type or reader-type of transponder) is considered a passive device. In certain embodiments, the radio device disclosed herein is capable of actively transmitting information; such a radio device is an active device because it can actively transmit information. Certain such active devices transmit without the need for any activation by an external, remote transponder (e.g., at periodic intervals) and other such active devices actively transmit information in response to an appropriate activation received from an external, remote transponder. In certain embodiments of the fourth embodiment disclosed herein, the radio device conveys or transmits information via electromagnetic radio waves having a frequency in the range that is allowable according to local regulations. For example, in the United States, this frequency generally ranges from about 900 MHz to about 930 MHz (including 900 MHz to 930 MHz) (the current approved range being 902-928 MHz at a power level not to exceed 36 dbm) and in portions of Europe and Asia may be at a somewhat lower frequency of about 860 MHz (including 860 Mz) (the current approved range in portions of Europe is 865.6-867.6 MHz at a power level not to exceed 33 dBm). Generally, the radio devices discussed herein will be designed to convey or transmit information at a frequency ranging from about 860 MHz to about 960 MHz (including 860 MHz to 960 MHz). However, in certain embodiments of the fourth embodiment disclosed herein, the radio devices discussed herein may be designed to convey or transmit information at another frequency range. Examples of suitable radio devices for use with the electronic communication modules disclosed herein include transponders (e.g., devices that both receive information and transpond at least a portion of it), transmitters, receivers, and reflectors. Generally, the radio device is configured to convey or transmit information to/from an external, remote communication device, which itself may be a transponder, transmitter, receiver, or reflector depending on the functionality of the radio device of the electronic communication module of the fourth embodiment that it is communicating with (e.g., if the remote communication device is a transmitter, the electronic communication module's radio device is a transponder, receiver, or reflector capable of interacting with the electromagnetic waves sent from the transmitter). As used herein, the term "radio device" is inclusive of any and all of the components necessary to operate as a transponder, transmitter, receiver, or reflector, e.g., a circuit board, memory, antenna, etc.

EXAMPLES

The following examples illustrate specific and exemplary embodiments and/or features of the embodiments of the present disclosure. The examples are provided solely for the purposes of illustration and should not be construed as limitations of the present disclosure. Numerous variations over these specific examples are possible without departing from the spirit and scope of the presently disclosed embodiments. It should be understood that methods other than those used below in Examples 2 and 3 can be utilized to prepare treated, cured inner liners. More specifically, it should be understood that different lamps (e.g., having somewhat different wavelengths and/or a different power), as well as different treatment times and distances from those used in Examples 2 and 3 (i.e., as fully as disclosed in the preceding paragraphs) can be utilized.

Example 1 (Control)

An bromobutyl rubber-containing inner liner is provided. The inner liner has its lower surface (i.e., the radially inward facing surface) treated with a polysiloxane-containing release treatment from Shin-Etsu Chemical Co., Ltd. The polysiloxane-containing release treatment is prepared by mixing Shin-Etsu's three-part system of base polymer (sold under the product name KNS-330), crosslinker (sold under the product name KNS-336), and catalyst (sold under the product name CAT-CN) in relative amounts of 100 parts, 10 parts and 2 parts (all by weight). The base polymer and catalyst components are mixed to uniform consistency, followed by addition of crosslinker and more mixing. After mixing, the composition is used immediately to treat the lower surface of the inner liner prior to placing a tire body containing the inner liner into a tire mold, closing the tire mold and curing. After curing and allowing time for cooling, the tire is removed from the mold. An acrylate-based pressure sensitive adhesive tape (product name 6038 from 3M company, Industrial Adhesives and Tapes Division) is used on the lower surface of the cured inner liner along with a foam noise barrier in an attempt to position the foam noise barrier upon the radially inward surface of the inner liner. Despite steady pressure applied to the inner liner+adhesive+foam noise barrier, the adhesive will not adhere to the lower surface of the inner liner, and, thus, the foam noise barrier cannot be securely positioned within the cured tire.

Example 2

A tire containing a cured inner liner with polysiloxane-containing release surface is prepared according to the procedure provided in Example 1 (including the steps through removal of the tire from the mold). However, prior to attempting to adhere the foam noise barrier, the lower surface of the cured inner liner is treated by being irradiated with radiation from a 600 Watt mercury lamp (the lamp utilized is a PortaRay 600 from Uvitron, described by its manufacturer as being UVA-enhanced), for 60 seconds, from a height of 8 cm. After treatment, the same type of acrylate-based pressure sensitive adhesive tape used in Example 1 is used on the lower surface of the treated, cured inner liner along with a foam noise barrier in an attempt to position the foam noise barrier upon the radially inward side of the inner liner. This time, the adhesive adheres well (the foam noise barrier cannot be removed without tearing of the inner liner and/or the foam noise barrier) to the treated, cured inner liner lower surface, thereby allowing secure positioning of the foam noise barrier within the cured tire.

Example 3

The method of Example 2 is followed except with the following changes: the lamp utilized is a 400 Watt mercury lamp (PortaRay 400 from Uvitron, also described as being UVA-enhanced), the time for irradiation is 120 seconds, and a height of 3 cm is used. After treatment, the same type of acrylate-based pressure sensitive adhesive tape used in Examples 1 and 2 is used on the lower surface of the treated, cured inner liner along with a foam noise barrier in an attempt to position the foam noise barrier upon the radially inward side of the inner liner. Similar to the results achieved in Example 2, the adhesive adheres well to the treated, cured inner liner lower surface, allowing secure positioning of the foam noise barrier within the cured tire.

Thus, as should be recognized from the description in Examples 2-3, above, the treatment of the lower surface of a cured inner liner having a polysiloxane-containing release using UV radiation results in a treated, cured inner liner with improved adherability which is capable of having a noise barrier adhered thereto with an adhesive tape. In contrast, a cured inner liner with the polysiloxane-containing release which is not subjected to the UV radiation treatment (Example 1) is not able to be adhered to a noise barrier using the adhesive tape.

This application discloses several numerical range limitations that support any range within the disclosed numerical ranges, even though a precise range limitation is not stated verbatim in the specification, because the embodiments of the compositions and methods disclosed herein could be practiced throughout the disclosed numerical ranges. With respect to the use of substantially any plural or singular terms herein, those having skill in the art can translate from the plural to the singular or from the singular to the plural as is appropriate to the context or application. The various singular or plural permutations may be expressly set forth herein for sake of clarity.

It will be understood by those within the art that, in general, terms used herein, and especially in the appended claims are generally intended as "open" terms. For example, the term "including" should be interpreted as "including but not limited to," the term "having" should be interpreted as "having at least," the term "includes" should be interpreted as "includes but is not limited to." It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). It will be further understood by those within the art that virtually any disjunctive word or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

All references, including but not limited to patents, patent applications, and non-patent literature are hereby incorporated by reference herein in their entirety.

While various aspects and embodiments of the compositions and methods have been disclosed herein, other aspects and embodiments will be apparent to those skilled in the art. The various aspects and embodiments disclosed herein are for purposes of illustration and are not intended to be limiting, with the true scope and spirit being indicated by the claims.

What is claimed is:

1. A method for treating the surface of a cured tire inner liner comprising:
    providing a cured tire inner liner having a thickness of 0.5 to 2 mm and an upper and a lower surface wherein the tire inner liner comprises rubber, a majority by weight of which comprises butyl rubber, and 10-100 phr of at least one filler comprising carbon black, clay, or silica, and the lower surface further comprises polysiloxane moieties, and
    treating the lower surface of the cured tire inner liner to convert at least a portion of the polysiloxane moieties to silanol moieties, thereby producing a treated, cured tire inner liner having a treated lower surface with at least a majority by weight of silicon atoms contained within silanol moieties.

2. The method of claim 1, wherein the treating comprises exposing the lower surface of the cured tire inner liner to radiation having a wavelength of less than 400 nm.

3. The method of claim 2, wherein the radiation has a wavelength of 315-280 nm.

4. The method of claim 3, wherein the exposing comprises subjecting the lower surface of the cured tire inner liner to the radiation for 0.2 to 2 minutes.

5. The method of claim 4, wherein the exposing comprises application of 50 to 500 milliwatts/cm$^2$ of radiation.

6. The method of claim 2, wherein the exposing comprises subjecting the lower surface of the cured tire inner liner to the radiation for 0.2 to 2 minutes.

7. The method of claim 6, wherein the exposing comprises application of 50 to 500 milliwatts/cm$^2$ of radiation.

8. The method of claim 2, wherein the exposing comprises application of 50 to 500 milliwatts/cm$^2$ of radiation.

9. The method of claim 1, wherein the treating comprises applying at least one inorganic oxidant to the lower surface of the cured tire inner liner.

10. The method of claim 1, further comprising adhering at least one component radially inner of the treated, cured tire inner liner.

11. The method of claim 10, wherein the at least one component radially inner of the treated, cured tire inner liner comprises a noise barrier and an adhesive layer is present between the inner liner and the noise barrier.

12. The method of claim 10, wherein the at least one component radially inner of the treated, cured tire inner liner comprises a sealant layer and no adhesive layer is present between the inner liner and the sealant layer.

13. The method of claim 10, wherein the at least one component radially inner of the treated, cured tire inner liner comprises a run-flat insert.

14. A method for treating the surface of a cured tire inner liner comprising:
    providing a cured tire inner liner having a thickness of 0.5 to 2 mm and an upper and a lower surface wherein the inner liner comprises rubber, a majority by weight of which comprises butyl rubber, and 10-100 phr of at least one filler comprising carbon black, clay, or silica, and the lower surface further comprises polysiloxane moieties, and
    treating the lower surface of the cured tire inner liner to increase its hydrophilicity by oxidizing at least a portion of the polysiloxane moieties, thereby producing a treated, cured tire inner liner having a treated lower surface with at least a majority by weight of silicon atoms contained within silanol moieties.

15. The method of claim 14, wherein the treating comprises exposing the lower surface of the cured tire inner liner to radiation having a wavelength of less than 400 nm.

16. The method of claim 15, wherein the radiation has a wavelength of 315-280 nm.

17. The method of claim 14, wherein the treating comprises applying at least one inorganic oxidant to the lower surface of the cured tire inner liner.

18. The method of claim 14, wherein the exposing comprises subjecting the lower surface of the cured tire inner liner to the radiation for 0.2 to 2 minutes.

19. The method of claim 15, wherein the exposing comprises subjecting the lower surface of the cured tire inner liner to the radiation for 0.2 to 2 minutes.

20. The method of claim 19, wherein the exposing comprises application of 50 to 500 milliwatts/cm$^2$ of radiation.

21. The method of claim 14, wherein the exposing comprises application of 50 to 500 milliwatts/cm$^2$ of radiation.

22. The method of claim 14, further comprising adhering at least one component radially inner of the treated, cured tire inner liner.

23. The method of claim 22, wherein the at least one component radially inner of the treated, cured tire inner liner comprises a noise barrier and an adhesive layer is present between the treated, cured tire inner liner and the noise barrier.

24. The method of claim 22, wherein the at least one component radially inner of the treated, cured tire inner liner comprises a sealant layer and no adhesive layer is present between the treated, cured tire inner liner and the sealant layer.

25. The method of claim 22, wherein the at least one component radially inner of the treated, cured tire inner liner comprises a run-flat insert.

* * * * *